May 28, 1946.  K. E. BELAU  2,401,041
SUPPORT
Filed July 6, 1944

INVENTOR.
KENNETH E. BELAU,
BY
ATTORNEY.

Patented May 28, 1946

2,401,041

UNITED STATES PATENT OFFICE 2,401,041

SUPPORT

Kenneth E. Belau, Milwaukee, Wis.

Application July 6, 1944, Serial No. 543,711

1 Claim. (Cl. 248—1)

My invention relates to supports and more particularly to a type of support that is adaptable for supporting plate glass or the like.

The object of my invention is to provide a support or perch for an object that must be brought to a pre-determined level, the support being made so that it is adjustable to any degree of angle to permit obtaining the correct position of the object to be supported.

Another object of my invention is to provide such a device that may be adjusted mechanically with or without special tools but without special mechanical skill.

A still further object of my invention is to provide a device of the character described that may be economically manufactured and yet provide any predetermined amount of adjustment at a minimum amount of expense.

Figure 1:
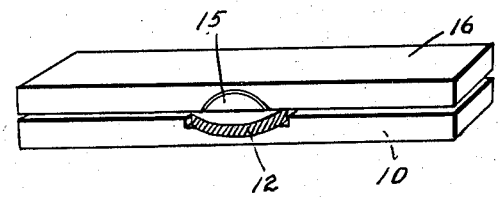
Figure 2:
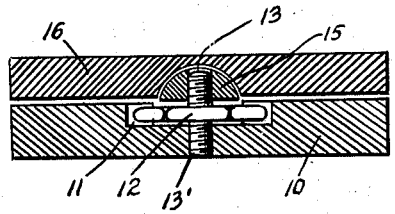
Figure 3:
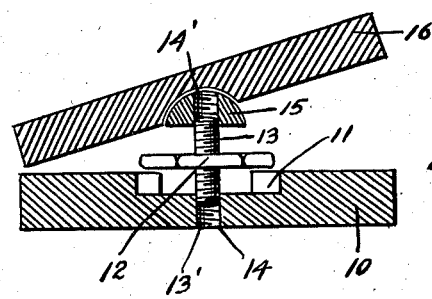
Figure 4:
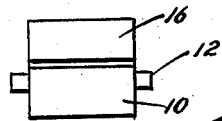

Other and further objects of my invention will become more apparent as the description proceeds when taken in conjunction with the drawing in which Figure 1 is a perspective view of the device, Figure 2 is a fragmentary cross-sectional view of the device in a retrieved position, Figure 3 is a view as shown in Figure 2 but in an extended position, Figure 4 is an end view of the device as shown in Figure 2, and Figures 5, 6 and 7 are perspective views of the threaded adjustment screw showing modified methods employed to permit revolving of the screw.

Similar characters of reference indicate corresponding parts throughout the several views and referring now to the same the character 10 shows a base block of rectangular shape recessed at the center 11 to accommodate the projecting ledge of an adjusting screw 12. The screw 12 is provided with threaded portions 13 and 13' which engage a threaded aperture 14 in the base block 10 and a threaded aperture 14' in a semi-cylindrical block 15, which acts as a bearing for a top plate 16. The plate 16 is provided with a radial slot to accommodate the bearing block 15 as shown.

The threaded portions 13 and 13' are provided with right and left hand thread respectively as are the bearing block 15 and the base plate 10 respectively.

By referring to Figure 3 it will be noted that the top plate 16 merely rests on the radial block 15 and may be pivoted to any degree of angle while resting on the block 15 and the screw 12 will, when revolved, spread the blocks 10 and 16 or permit them to be brought closer to one another.

Figures 5, 6, 7:
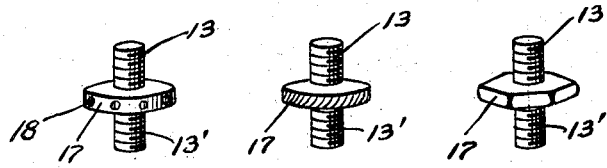

The projecting ledge 17 of the screw 12 may be of any desired shape or contour as shown in Figures 5, 6 and 7. In Figure 5 the ledge 17 is provided with a plurality of apertures 18 to accommodate a spanner wrench. In Figure 6 the ledge has a knurled edge to provide contact when the screw 12 is revolved by hand and in Figure 7 is shown a hexagon ledge 17 to accommodate any conventional type of wrench.

It is manifest to anyone familiar with the art that a device as described may be constructed in any size or contour and made of any material depending on the purpose for which it is to be used. The weight of the object to be suspended keeps the plate 16 in close contact with the radial block 15, yet permits any degree of angle of the plate 16.

The invention is susceptible to various changes in its form and minor details of construction and the right is herein reserved to make such changes as properly fall within the scope of the appended claim.

Having thus described my invention what I claim and desire to secure by Letters Patent in the United States is:

A device of the character described comprising in combination, a pair of members disposed parallel to one another, one of said members forming a base block, the other of said members forming a top plate, said top plate provided with a semicircular transverse groove centrally disposed, a semi-cylindrical block, said block engaging the groove in said top plate, an adjustment screw vertically disposed between said members, said screw provided with oppositely disposed members threaded opposite from one another, threaded apertures in said base plate and semi-cylindrical block to correspond with and engage the reversed pitch of said adjustable screw members, and means for permitting the revolving of said vertical adjustment screw to increase or decrease the space between said members.

KENNETH E. BELAU.